Patented Jan. 10, 1928.

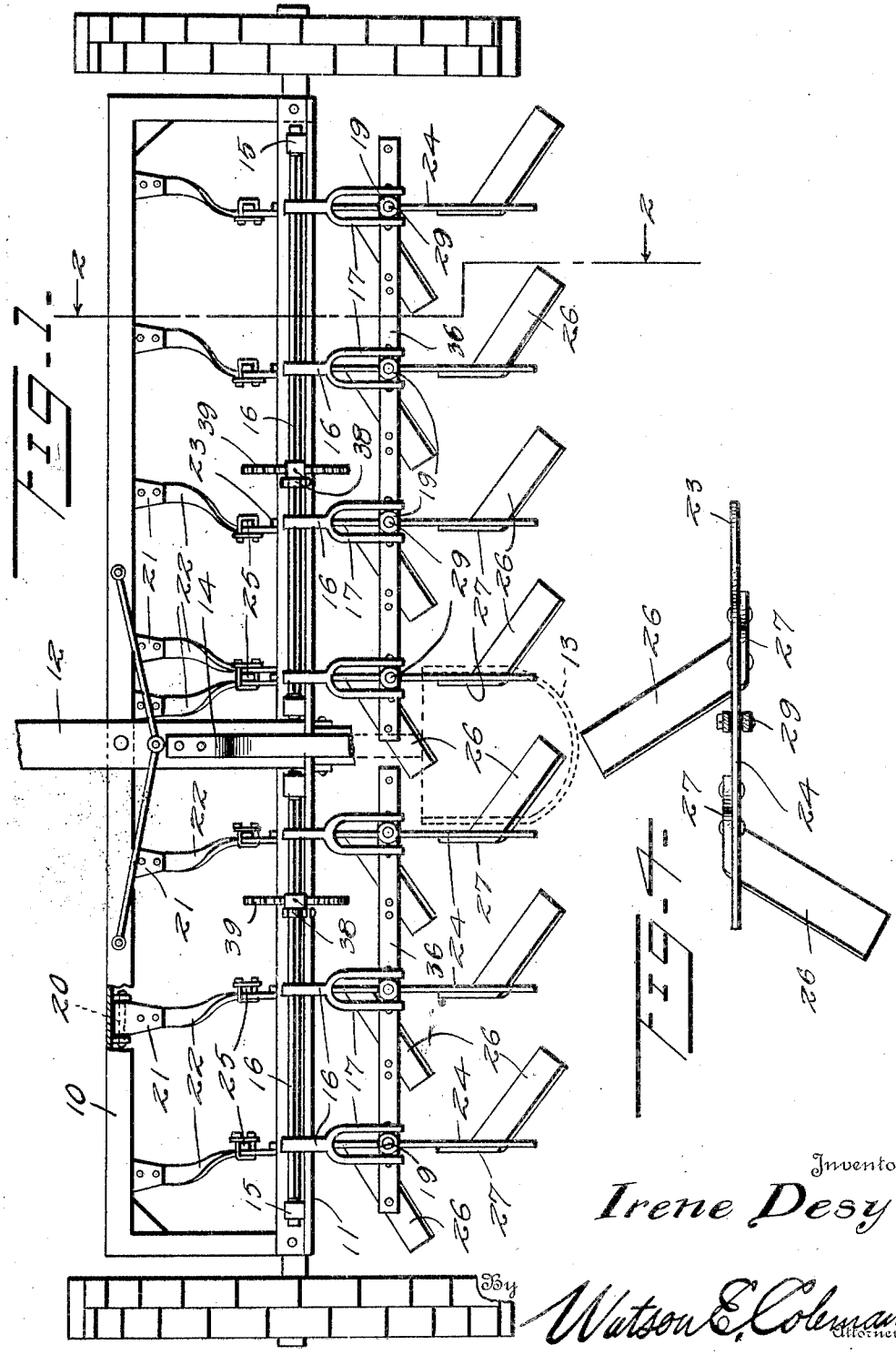

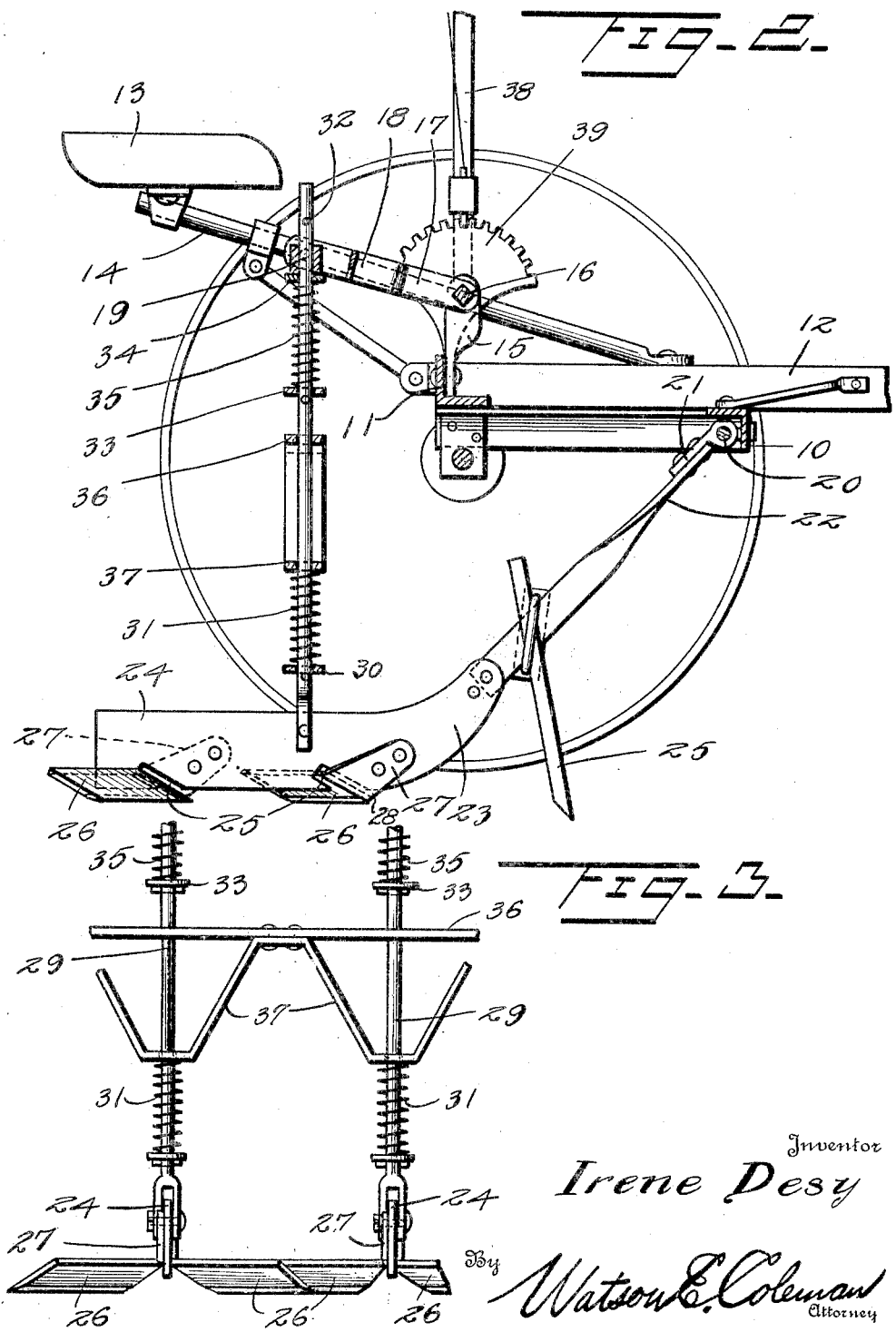

1,656,146

UNITED STATES PATENT OFFICE.

IRENE DESY, OF LEWISTOWN, MONTANA.

WEEDER.

Application filed April 20, 1927. Serial No. 185,332.

This invention relates to weeders and more particularly to a device of this character which includes blades operating beneath the surface of the soil to destroy the roots of the weeds and force the same to the surface of the ground.

An important object of the invention is to provide in a device of this character an improved method of mounting these blades upon shoes by which they are carried.

A further object of the invention is to provide an improved method of mounting the shoes themselves, so that these shoes may be adjusted to cut at varying depths and will at any of the cutting depths be capable of independent vertical movement to enable them to pass over the stones or other obstructions, which would otherwise destroy the blades thereof.

A further object of the invention is to provide a device of this character which may be readily and cheaply constructed, which will be durable and efficient in service and a general improvement in the art.

These and other objects I attain by the construction shown in the accompanying drawings, wherein for the purpose of illustration is shown a preferred embodiment of my invention and wherein:—

Figure 1 is a plan view of a weeder constructed in accordance with my invention, a portion of the frame being broken away to show the method of connecting the shoes thereto;

Figure 2 is a section on the line 2—2 of Figure 1;

Figure 3 is a fragmentary rear elevation of a pair of adjacent shoes, their push rods and the guide and spacing bar associated therewith;

Figure 4 is a plan view of one of the shoes.

Referring now more particularly to the drawings, the weeder includes a wheel supported frame having front and rear cross bars 10 and 11. Secured to this frame are the usual draft beam 12 and seat 13, the latter being mounted upon a support 14 extending rearwardly from the frame.

In accordance with my invention, I mount in bearings 15 carried by the rear cross member 11 a pair of aligned shaft sections 16, to which are rigidly secured a plurality of arms 17. The outer ends of these arms are forked, as at 18, and have arranged between the tines of the fork a swiveled eye 19. To the front cross member of the frame, I secure pivots 20 corresponding in number and arrangement to the arms 17, these pivots being horizontally disposed and extending transversely of the frame. Upon each pivot is mounted a casting 21, to which is secured a draw bar 22, the rear end of which is pivoted to the forward extremity of the forwardly and upwardly inclining forward end 23 of a shoe 24. To each draw bar immediately in advance of the point of its attachment to the shoe, a coulter 25 is secured. The draw bar 24 is in the form of a longitudinally extending bar placed on edge and having its forward end upbent to provide the terminal 23. The lower edge of the bar is formed with notches 25 having an angle to the bottom face of the bar equal to the angle at which the blade 26 is to be placed to the bar. The blade 26 is extended through this notch and has an upbent end portion 27, which is riveted or otherwise secured to the bar to maintain the blade in position in the notch.

It will be obvious that if a blade must be replaced, it is simply necessary to remove the rivet and knock the same from the notch which it occupies. Since the notches are not of the same depth as the width of the blades, the forward edges of these blades will project out of the notches and below the lower face of the bar and thus serve to prevent the bar forming the shoe from becoming unduly worn. By varying the angle of the bend 28 producing the upturned portion of the blades, the angle produced between the longitudinal axis of the blade and the shoe may be varied.

Each shoe 24 has pivoted thereto intermediate the ends of the straight portion thereof the lower end of a push rod 29. Upon stop collars 30 carried by the push rods adjacent the lower ends thereof are seated the lower ends of the springs 31, which surround the push rods. The upper ends of the push rods are directed through the swiveled eyes 19 of the arms of the associated shaft section and have extended therethrough above these eyes pins 32 against which the eyes will engage when the associated shaft is rotated a predetermined extent, so that the shoes may be lifted through the push rods. Below each eye, each push rod has a fixed spring seat 33 and above this fixed spring seat a movable spring seat 34. A spring 35 surrounding the push rod between the spring seats is compressed as the eye is moved downwardly against the spring seat 34 and accordingly constantly yieldably urges the push rod downwardly. It will, however, be obvious that the push rod may move upwardly under stress as, for example, when the shoe comes into engagement with a stone or other obstruction.

As a means for maintaining the shoes associated with each shaft section in properly spaced relation, I associate with the push rods of each shaft section a transversely extending bar 36 having openings through which the push rods are directed. To the under surface of this bar, I secure V-shaped supports 37, one for each push rod, these supports having the ends of their arms attached to the bar 36 and having at their apices openings for the passage of the push rod. These apices rest upon the upper ends of the springs 31 to be supported thereby. It will be obvious that as a shoe rises under stress and during operation, its spring 31, as well as the spring 35, will be compressed. The spring 31, when compressed to a certain extent, will elevate the associated guide structure and thus serve to prevent any tendency to binding of the guide structure upon the push rods. This is due to the fact that as the guide structure is elevated, it more closely approaches the fixed point represented by the eyes 19. The V-shaped supports 37 are preferably formed integrally with one another by suitably folding a bar. The shaft sections will each have associated therewith an operating lever 38 coacting with the usual segment 39, whereby it may be held in adjusted position.

Since the construction hereinbefore set forth is obviously capable of a certain range of change and modification without materially departing from the spirit of the invention, I do not limit myself to such specific structure except as hereinafter claimed.

I claim:—

1. In a weeder, a wheel supported frame, blade carrying shoes pivoted to the frame to swing in vertical planes, a rotatable shaft carried by the frame and having an arm for each shoe, a rod connected with each shoe, a swiveled eye carried by each arm and through which the associated rod is extended, a spring surrounding each rod between the associated eye and a stop carried by the rod, a horizontal member free from connection with said frame through which each rod is directed between its eye and the point of its connection to the shoe.

2. In a weeder, a wheel supported frame, blade carrying shoes pivoted to the frame to swing in vertical planes, a rotatable shaft carried by the frame and having an arm for each shoe, a rod connected with each shoe, a swiveled eye carried by each arm and through which the associated rod is extended, a spring surrounding each rod between the associated eye and a stop carried by the rod, a horizontal member free from connection with said frame through which each rod is directed between its eye and the point of its connection to the shoe, said horizontal member engaging each rod at two points spaced longitudinally thereof.

3. A ground working implement for weeders comprising a member having formed in one edge thereof slots disposed at an angle to said edge and opening therethrough and blades extended through the slots and having bent terminal portions engaging one face of the bar and securing elements extending through said terminal portions to secure the blades to the bar, said slots being of less depth than the width of said blades.

4. In a weeder, a wheel supported frame, blade carrying shoes pivoted to the frame to swing in vertical planes, a rod for each shoe and pivotally connected at its lower end to the shoe, means engaging the upper ends of the rods for yieldably urging the same downwardly and a transversely extending horizontal member free from connection with said frame and through which each rod is directed and means surrounding the rod between the shoes and said member for yieldably supporting the member.

5. In a weeder, a wheel supported frame, blade carrying shoes pivoted to the frame to swing in vertical planes, a rod for each shoe and pivotally connected at its lower end to the shoe, means engaging the upper ends of the rods for yieldably urging the same downwardly and a transversely extending horizontal member free from connection with said frame and through which each rod is directed and means surrounding the rod between the shoes and said member for yieldably supporting the member, said horizontal member yieldably engaging each rod at two points spaced longitudinally of the rod.

6. In a weeder, a wheel supported frame, blade carrying shoes pivoted to the frame to swing in vertical planes, a rotatable shaft carried by the frame and having an arm for each shoe, a rod connected with each shoe, a swiveled eye carried by each arm and through which the associated rod is extended, a spring surrounding each rod between the associated eye and a stop carried by the rod, a horizontal member free from connection with said frame through which each rod is directed between its eye and the point of its connection to the shoe and a spring surrounding each rod between the associated shoe and said horizontal member.

7. In a weeder, a wheel supported frame, blade carrying shoes pivoted to the frame to swing in vertical planes, a rotatable shaft carried by the frame and having an arm for each shoe, a rod connected with each shoe, a swiveled eye carried by each arm and through which the associated rod is extended, a spring surrounding each rod between the associated eye and a stop carried by the rod, a horizontal member free from connection with said frame through which each rod is directed between its eye and the point of its connection to the shoe, said horizontal member engaging each rod at two points spaced longitudinally thereof and a spring surrounding each rod between the associated shoe and said horizontal member.

In testimony whereof I hereunto affix my signature.

IRENE DESY.